United States Patent [19]
Fuh et al.

[11] Patent Number: 6,065,013
[45] Date of Patent: May 16, 2000

[54] OPTIMAL STORAGE MECHANISM FOR PERSISTENT OBJECTS IN DBMS

[75] Inventors: Gene Y. C. Fuh; Bruce Gilbert Lindsay; Nelson Mendonca Mattos; Brian Thinh-Vinh Tran, all of San Jose; Yun Wang, Saratoga, all of Calif.

[73] Assignee: International Business Machines Corporation, Armonk, N.Y.

[21] Appl. No.: 08/914,394

[22] Filed: Aug. 19, 1997

[51] Int. Cl.[7] .................................................. G06F 17/30
[52] U.S. Cl. ........................... 707/103; 707/100; 395/877
[58] Field of Search ................................... 707/103, 100; 395/877, 872, 873, 875, 876

[56] References Cited

U.S. PATENT DOCUMENTS

| | | | |
|---|---|---|---|
| 4,445,174 | 4/1984 | Fletcher | 711/121 |
| 5,291,583 | 3/1994 | Bapat | 395/500 |
| 5,701,489 | 12/1997 | Bates et al. | 395/705 |
| 5,778,378 | 7/1998 | Rubin | 707/103 |
| 5,799,310 | 8/1998 | Anderson et al. | 707/102 |
| 5,864,843 | 1/1999 | Carino, Jr. et al. | 707/4 |

*Primary Examiner*—Paul R. Lintz
*Assistant Examiner*—Greta L. Robinson
*Attorney, Agent, or Firm*—Pretty, Schroeder & Poplawski, P.C.

[57] ABSTRACT

A method, apparatus, and article of manufacture for a computer implemented storage mechanism for persistent objects in a database management system. A statement is executed in a computer. The statement is performed by the computer to manipulate data in a database stored on a data storage device connected to the computer. It is determined that an object is to be stored in an inline buffer. When the object can be entirely stored in the inline buffer, the object is stored in the inline buffer. When the object cannot be entirely stored in the inline buffer, a selected portion of the object is stored in the inline buffer and the remaining portion of the object is stored as a large object.

33 Claims, 9 Drawing Sheets ofOPTIMAL STORAGE MECHANISM FOR
PERSISTENT OBJECTS IN DBMS

BACKGROUND OF THE INVENTION

1. Field of the Invention

This invention relates in general to a computer-implemented storage mechanism, and more particularly, to a storage mechanism for persistent objects in a database management system.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semipermanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQI, interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

Traditionally, a RDBMS stored simple data, such as numeric and text data. In a traditional RDBMS, the underlying storage management has been optimized for simple data. More specifically, the size of a record is limited by the size of a data page, which is a fixed number (e.g., 4K) defined by a computer developer. This restriction in turn poses a limitation on the length of columns of a table. To alleviate such a restriction, most computer developers today support a new built-in data type for storing large objects (LOBs). Large objects, such as image data, typically take up a great deal of storage space. However, the access time for LOB object data is significantly slower than that of simple data types. This occurs because the LOB object data is accessed through a LOB descriptor stored in a record buffer and requires an extra input/output (I/O) access of a database. In many applications, where the average size of an object is typically much smaller than the largest size of the object, using a LOB descriptor is the only way to store object data, but storage comes at the cost of performance. This problem also applies to structured object types, such as abstract data types, arrays, lists, sets, etc. There is a need in the art for an improved method of storing persistent data.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented storage mechanism for persistent objects in a database management system.

In accordance with the present invention, a statement is executed in a computer. The statement is performed by the computer to manipulate data in a database stored on a data storage device connected to the computer. It is determined that an object is to be stored in an inline buffer. When the object can be entirely stored in the inline buffer, the object is stored in the inline buffer. When the object cannot be entirely stored in the inline buffer, a selected portion of the object is stored in the inline buffer and the remaining portion of the object is stored as a large object.

An object of the invention is to provide an improved storage mechanism for persistent objects. Another object of the invention is to provide an inline buffer for use in storing persistent objects. Yet another object of the invention is to provide a storage mechanism for both compound and non-compound objects that uses large objects to store data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
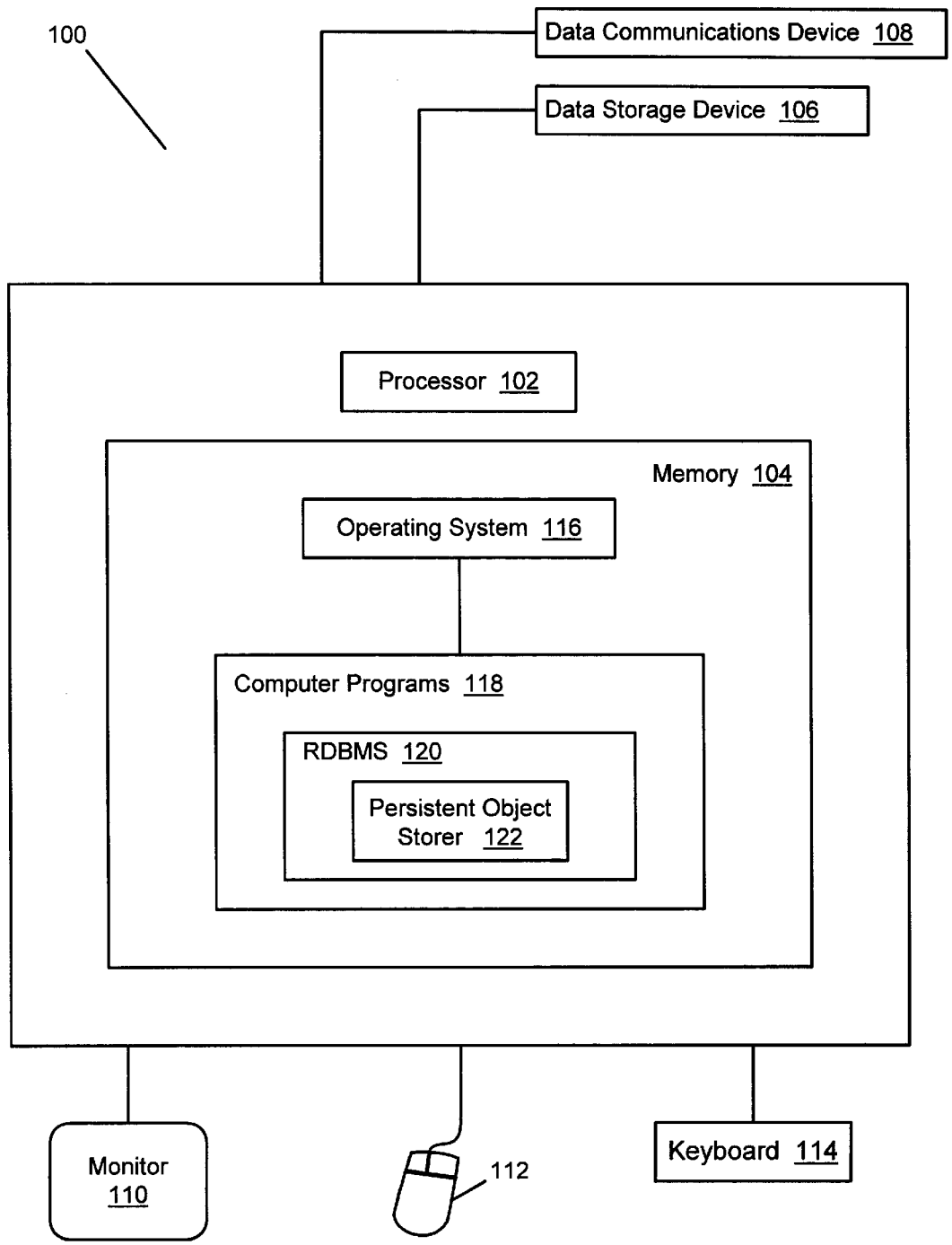
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as MVS™, AIX™, OS/2™, WINDOWS NT™, WINDOWS™, UNIX™, etc. The operating system 116 is booted into the memory 104 of the computer 100 for execution when the computer 100 is powered-on or reset. In turn, the operating system 116 then controls the execution of one or more computer programs 118 by the computer 100. The present invention is generally implemented in these computer programs 118, which execute under the control of the operating system 116 and cause the computer 100 to perform the desired functions as described herein. Alternatively, the present invention may be implemented in the operating system 116 itself. In particular, the present invention is typically implemented using relational database management system (RDBMS) software 120, such as the DB2 product sold by IBM Corporation, although it may be implemented with any database management system (DBMS) software.

The RDBMS software 120 receives commands from users for performing various search and retrieval functions, termed queries, against one or more databases stored in the data storage devices 106. In the preferred embodiment, these queries conform to the Structured Query Language (SQL) standard, although other types of queries could also be used without departing from the scope of the invention. The queries invoke functions performed by the RDBMS software 120, such as definition, access control, interpretation, compilation, database retrieval, and update of user and system data. The RDBMS software 120 invokes the persistent object storage software 122 to store and access data.

The operating system 116 and computer programs 118 are comprised of instructions which, when read and executed by the computer 100, causes the computer 100 to perform the steps necessary to implement and/or use the present invention. Generally, the operating system 116 and/or computer programs 118 are tangibly embodied in and/or readable from a device, carrier, or media, such as memory 104, data storage devices 106, and/or data communications devices 108. Under control of the operating system 116, the computer programs 118 may be loaded from the memory 104, data storage devices 106, and/or data communications devices 108 into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Overview

In a database, a table is assigned to a table space. A table space contains one or more datasets. In this way, the data from a table is assigned to physical storage on RASD. A table space can be a system managed space (e.g., an operating system file system) or a database managed space. Each table space is physically divided into equal units called pages. Each page, which typically contains 4K bytes, holds one or more rows of a table and is the unit of input/output (I/O). The rows of a table are physically stored as records on a page. A record is always fully contained within a page and is limited by page size. As users move towards working with image data and other large data objects, storing data in conventional records becomes difficult.

Figure 2:
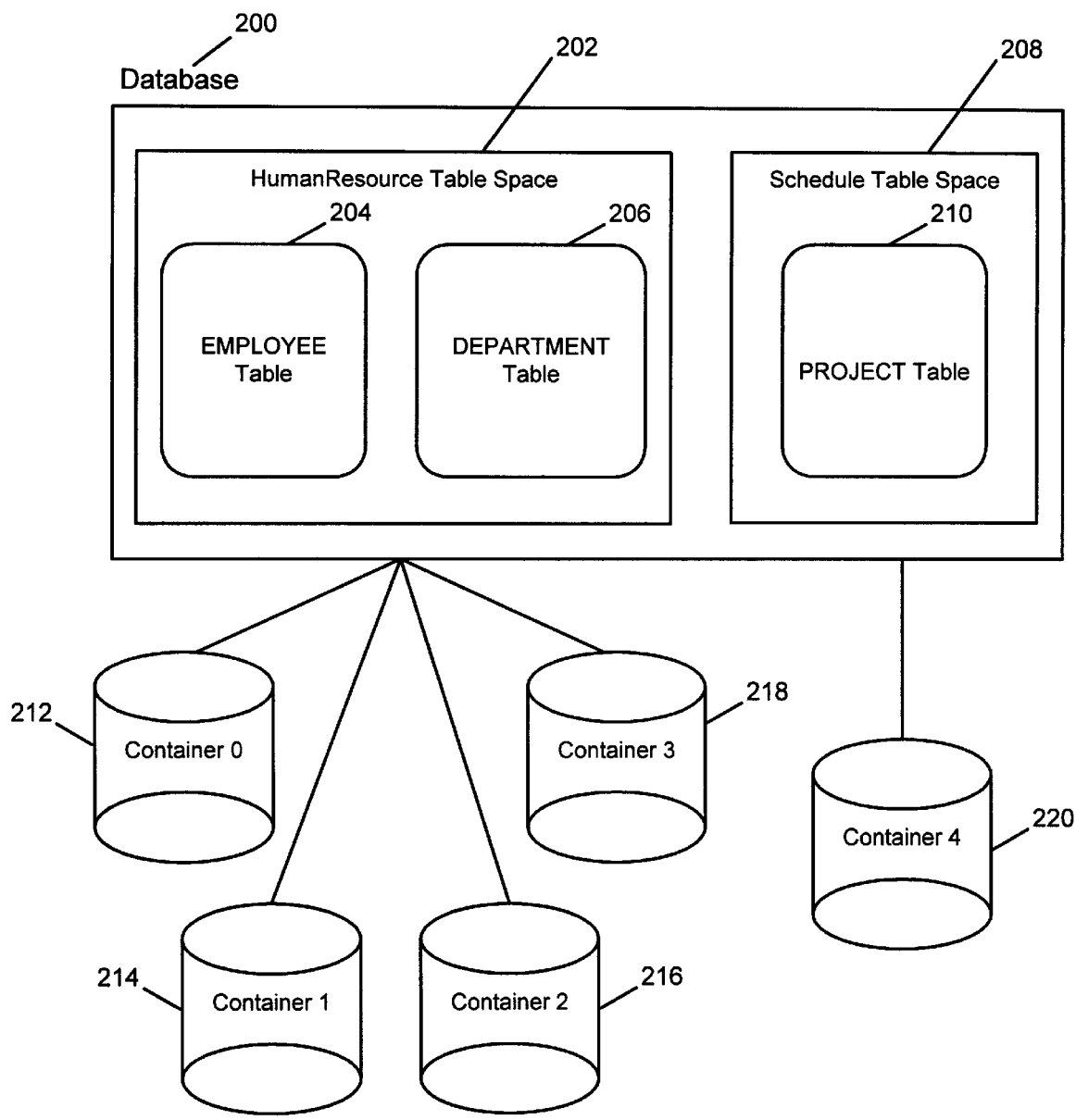
FIG. 2 is a diagram illustrating a traditional storage mechanism for a database.

FIG. 2 is a diagram illustrating a traditional storage mechanism for a database 200. A database 200 has a Human Resource table space 202 and a Schedule table space 208. The table spaces are stored on data storage devices 106, called containers, 212, 214, 216, 218. and 220. The Human Resource table space 202 stores two tables, an Employee table 204 and a Department table 206. The Human Resources table space 202 is physically stored on Containers "0–3" 212, 214, 216, and 218. The Schedule table space 208 stores a Project table 210 and is physically stored on Container "4" 220.

The use of containers 212, 214, 216, 218, and 220 to store a database 200 increases I/O parallelism as different containers 212, 214, 216, 218, and 220 can be accessed at the same time. Additionally, the use of containers 212, 214, 216, 218, and 220 increases the size limitation of a table space, as the table space can be stored on multiple containers 212, 214, 216, 218, and 220.

Figure 3:
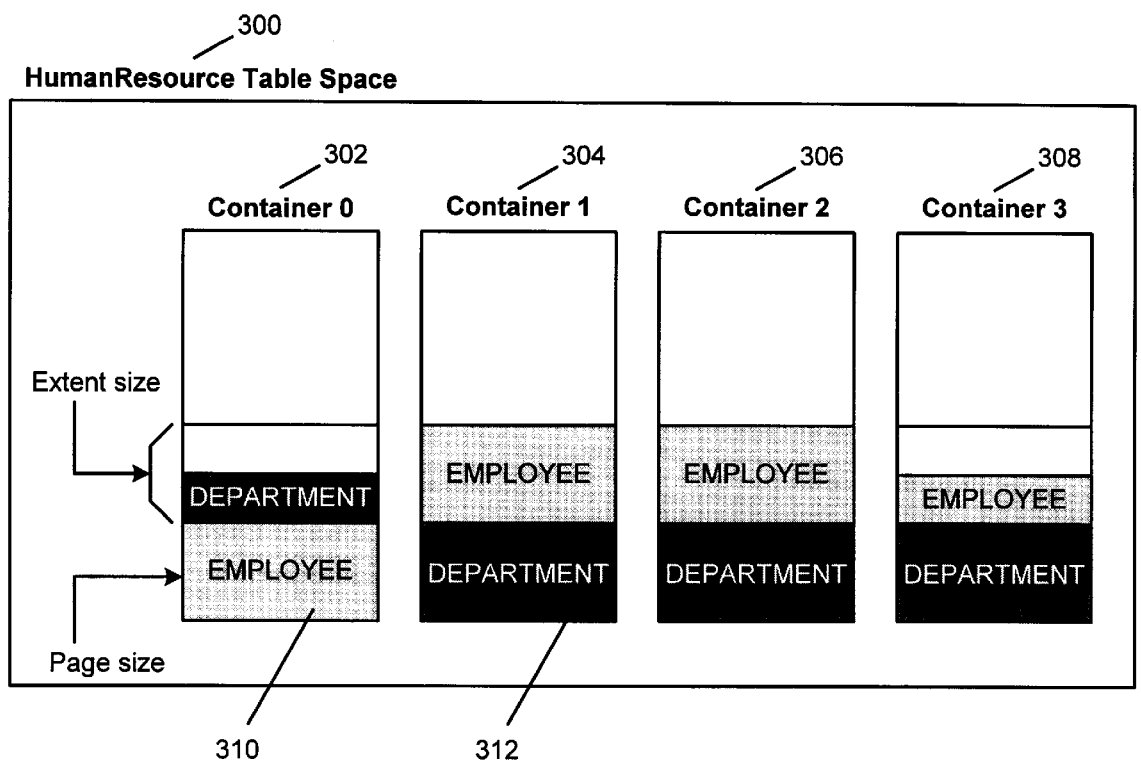
FIG. 3 is a diagram illustrating physical storage of a table space. The Human Resources table space is stored across several containers.

The extent size and page size of table spaces enables balanced data distribution and data pre-fetch. FIG. 3 is a diagram illustrating physical storage of a table space. The Human Resources table space 300 is stored across several containers 302, 304, 306, and 308. To balance the data distribution, the containers 302, 304, 306, and 308 are first populated with data from the Employee table 310, then these containers 302, 304, 306, and 308 are populated with data from the Department table 312 based on how much space the data from the Employee table 310 took in each container 302, 304, 306, and 308. In particular, the Employee table 310 is stored across all four containers 302, 304, 306, and 308, starting with container "0" 302. The Department table 312 is also stored across all four containers 302, 304, 306, and 308, but the first part of the Department table 312 is stored in Container "1" 304 and ends in Container "0" 302. The starting container 302, 304, 306, or 308 of a table is hashed by a table identifier.

Additionally, parallel I/O is possible when data is stored in several containers 302, 304, 306, and 308. For example, while the operating system is busy processing data, an I/O unit can bring in data from one of the containers 302, 304, 306, and 308. The containers 302, 304, 306, and 308 have a storage hierarchy that enables parallel I/O.

Figure 4:
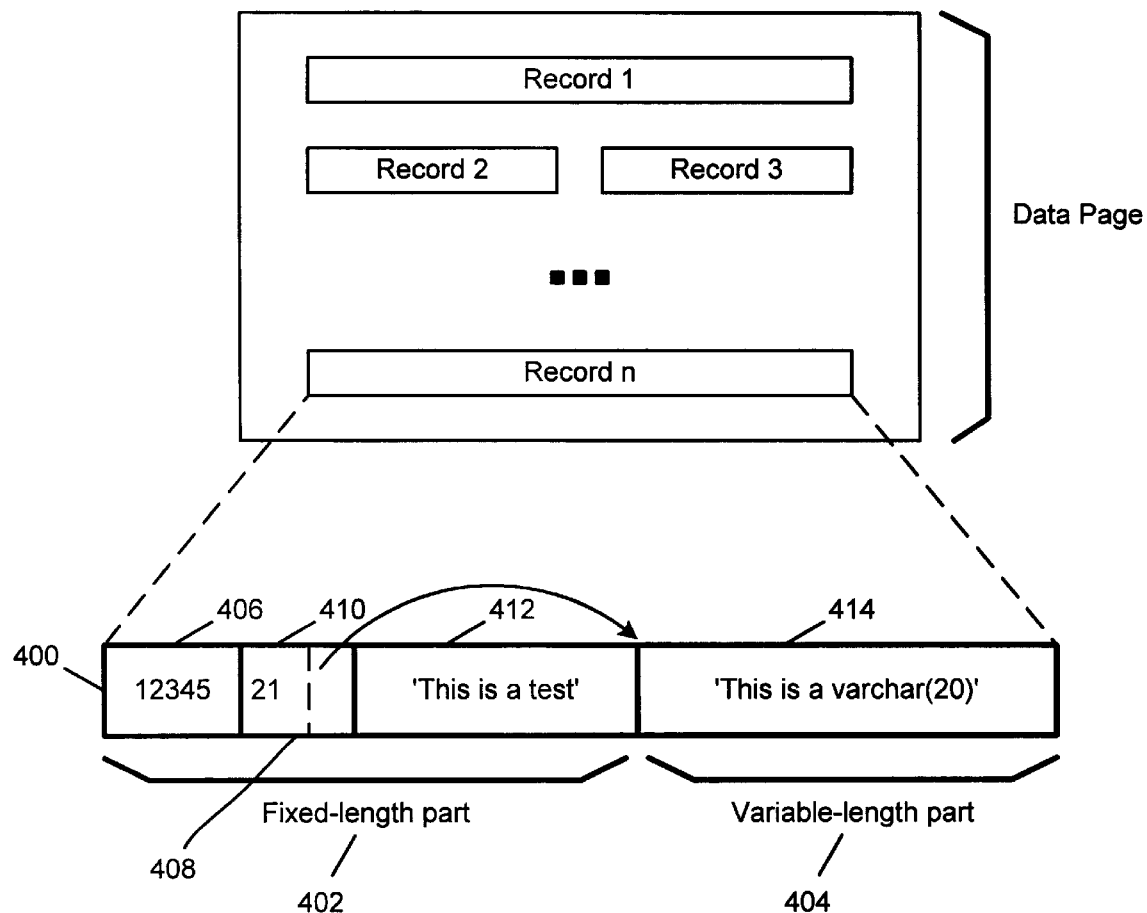
FIG. 4 is a diagram illustrating the storage of records in a data page.

FIG. 4 is a diagram illustrating the storage of records in a data page. Record 400 represents a tuple in a table created using the following query:

CREATE TABLE tbl (c1 INT, c2 VARCHAR(100), c3 CHAR(15));

The table tbl has three columns, with an attribute c1 representing an integer, an attribute c2 representing a variable-length character string that can have a maximum of 100 characters, and an attribute c3 representing a fixed-length character string that can have a maximum of 15 characters. Record 400 is divided into a fixed-length part 402 for storing fixed-length data and a variable-length part 404 for storing variable-length data. The fixed-length part 402 includes raw data for fixed-length types 406, such as the attribute c1, and contains a length/pointer 408 for variable-length types, such as the attribute c2. Because the attribute c2 could be a maximum of 100 characters, and a single record cannot go across two pages, rather than reserving 100 characters of space in the fixed-length part 402 of the record 400, the length/pointer 408 includes a length field 410 indicating the actual length of attribute c2 and a reference (e.g., pointer) 412 indicating the location of the data 414 for attribute c2. The fixed-length part 402 also includes a fixed-length character portion 412 for storing c3.

The memory representation is encapsulated with a value descriptor before being processed. For example, a pointer can be stored with a record that identifies a million bytes of data, but the data can be anywhere in physical memory. The data representation/code page may change during bind-in and bind-out. A conventional RDBMS deals with traditional SQL data types, including:

Numeric types: small int, int, float, double, and decimal.

Fixed-length character strings: char(n), graphic(n).

Variable-length character strings: varchar(n), vargraphic (n).

Date, time, and timestamp.

Large Object Types

Large object types include audio, video, image, text, spatial data (e.g., shape, point, line, polygon, etc.), time series data, OLE documents, Java objects, C++ objects, etc. The following issues arise in the context of storing LOB objects in a RDBMS:

Getting around the page size limit.

Determining the operations that are required and/or allowed.

Storing and manipulating the objects efficiently.

Currently, storing large object types is difficult due to the page size limit. Some vendors get around this problem by providing for storage of a maximum of two megabytes (2M) of data. Yet, there is still a problem with storing more than 2M of data. Additionally, there are still questions about which operations are allowed and/or required for LOB objects and about whether LOB objects can be stored and manipulated efficiently.

For the SQL language, host types include character strings for LOB objects, integer identifiers for LOB locators, and file handles. SQL types include large character strings (CLOBs) that are less than or equal to two gigabytes (2GB), large binary strings (BLOBs) that are less than or equal to 2GB, and large character strings in double-byte code pages (DBCLOB(n)) that are less than or equal to 2GB. One skilled in the art would recognize that these are just examples of conventional types, but that other types, of larger sizes, could also be used with the present invention.

The following example SQL statements indicate the usage of a BLOB object. One skilled in the art would recognize that similar SQL statements could include other large object types.

CREATE TABLE mediaTable ( . . . , media BLOB (1M), . . . );

INSERT INTO mediaTable VALUES ( . . . , mediaHv, . . . );

SELECT media from mediaTable WHERE rate='PG';

For the above SQL statements, the Create statement creates a table, mediaTable, that includes a column for a binary large object, BLOB object, that can have a maximum size of one megabyte (1M). The RDBMS does not understand what the BLOB object is and views the BLOB object as a "black box". The BLOB object can be an image or audio data or could be a programming language object (e.g., C++, Java, etc.) or a Common Object Module (COM) object (e.g., an OLE document).

Storing large objects in a RDBMS is useful as the RDBMS supports several operations for large objects, including:

Bind-in from LOB strings, locators, or file handles.

Bind-out to LOB buffers, locators, or file handles.

Sub-string (e.g. substr(lobObj, 1, 1000)).

Concatenation (e.g., videoFrame1|videoFrame2).

Length (e.g., length(document)).

Fetch, insert, and delete.

Figure 5:
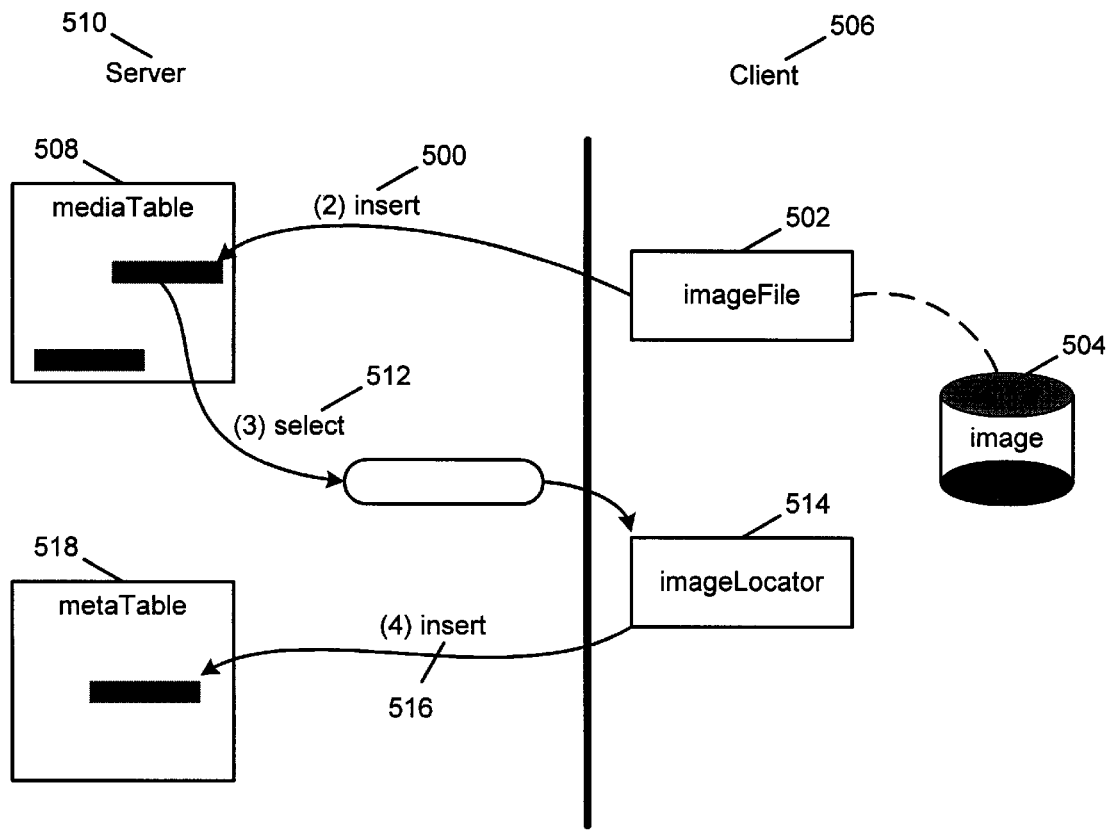
FIG. 5 is a diagram illustrating the execution of example SQL statements.

FIG. 5 is a diagram illustrating the execution of example SQL statements. The following are example SQL statements:

(1) CREATE TABLE mediaTable ( . . ., media BLOB (1M), . . .);
(2) INSERT INTO mediaTable VALUES ( . . ., :imageFile, . . .);
(3) SELECT INTO :imageLocator FROM mediaTable WHERE . . .;
(4) INSERT INTO metaTable VALUES ( . . ., format (:imageLocator), . . .);
(5) INSERT INTO mediaTable VALUES ( . . ., :imageFile ∥ substr(:imageLocator), . . .);
(6) UPDATE mediaTable SET media :imageFile;

The Create statement creates a table. The (2) Insert statement inserts data into the table. Specifically, as illustrated in FIG. 5, the (2) Insert statement 500 inserts an imageFile 502 from an image database 504 connected to a client 506 into the mediaTable 508 at the server 510. The (3) Select statement 512 selects data from the mediaTable 508 into the imageLocator 514. The (4) Insert statement 516 inserts data from the imageLocator 514 into the metaTable 518. Although not shown in FIG. 5, statements (5) and (6) provide additional examples of SQL statements that can be used to manipulate a table containing large objects. For example, the (5) Insert statement inserts more data into the mediaTable 508, and the (6) Update statement updates the mediaTable 508.

Figure 6:
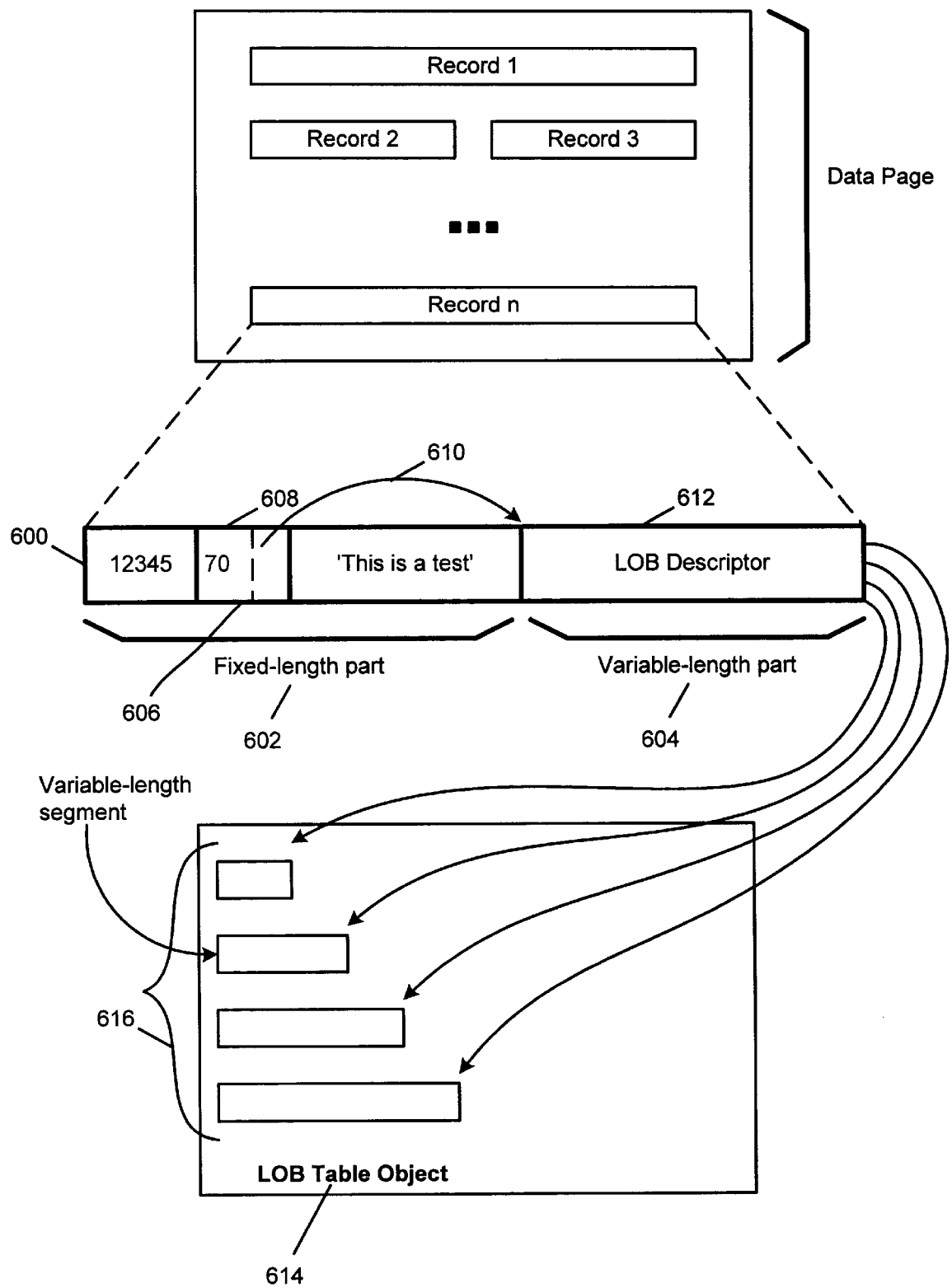
FIG. 6 is a diagram illustrating a storage mechanism for large object types.

FIG. 6 is a diagram illustrating a storage mechanism for large object types. Record 600 represents a tuple in a table created using the following query:

CREATE TABLE tbl (c1 INT, c2 BLOB(1M), c3 CHAR(15));

A record 600 includes a fixed-length part 602 and a variable-length part 604. The fixed-length part includes a length/pointer portion 606 for describing the location of the BLOB object, c2. In particular, the length/pointer portion 606 includes a length 608 of a LOB descriptor 612 and a pointer 610 to the LOB descriptor 612. The LOB descriptor 612 is stored in the variable-length part 604 of the record 600. The LOB descriptor 612 maps to the location in memory of the large object. The LOB descriptor is stored in the record buffer 612, while the LOB object data is stored in a LOB table object 614. The LOB object has no page limitation. The LOB object is actually stored in variable-length segments 616. A query manipulating a LOB object is optimized for certain operations, including sub-string, append, length, and type conversion.

Figure 7:
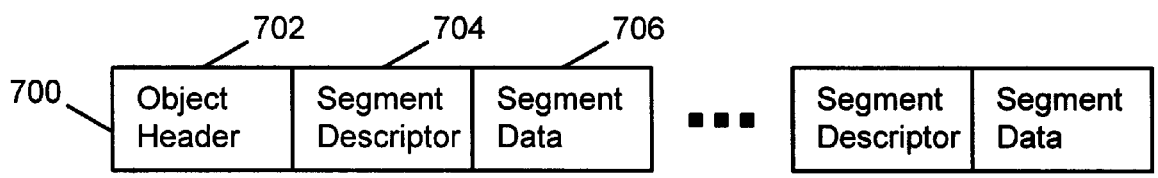
FIG. 7 is a diagram illustrating a representation of a LOB descriptor.

FIG. 7 is a diagram illustrating a representation of a LOB descriptor 700. The LOB descriptor 700 contains an object header 702. The object header 702 indicates the number of the segments into which the LOB object data is partitioned and stored. The LOB descriptor 700 also includes pairs of segment descriptors 704 followed by segment data 706. The segment descriptor 702 describes how the segment data is represented. Each segment can have a different representation. The segment data 706 identifies the data for the segment. The representation of a LOB descriptor illustrated in FIG. 7 is referred to as a compact representation. The compact representation is used in the database engine to represent a LOB descriptor. No data materialization is performed unless necessary, including: substring, concatenation, length, type conversion, fetch from table, bind-out to client and insert or update table. Limited optimization is provided for update.

The LOB descriptor enables storing large objects in a RDBMS. Currently, the size limitation is 2GB, but one skilled in the art would recognize that the size limitation could change by changing the number of bytes used to represent data. However, manipulating a LOB object could require an extra I/O to retrieve the data indicated in the LOB descriptor. Also, there is no pre-fetch for a LOB object.

The following is an example SQL statement using a LOB object:

```
CREATE TABLE map (name VARCHAR(30), . . .,
              geographicalInfo BLOB (2M));
INSERT INTO map VALUES ('Queen Anne Dr., San Jose', :map1),
              ('Santa Clara County, CA', :map2),
              ('California', :map3);
```

The size of the binary large object, BLOB object, can be a maximum of 2M. The map table stores geographical data for maps. A BLOB object is typically the best choice for storing such data. Most geographic data is smaller than 1K (e.g., street names), but storage flexibility is required for a few large geographical data (e.g., a map of California).

Abstract Data Types

An abstract data type (ADT) object is a compound object that can include audio, video, image, text, spatial data (e.g., shape, point, line, polygon, etc.), time series data, OLE documents, Java objects, C++ objects, etc. along with meta information about the objects.

The following issues arise in the context of storing compound objects in a RDBMS:

Getting around the page size limit.

Selecting an object model and deciding questions of inheritance.

Determining the operations that are required and/or allowed.

Storing and manipulating the objects efficiently.

In the SQL language, host types include ADT structures and ADT locators. SQL types include user defined structured types, an arbitrary number of attributes, and nested ADT objects. Additionally, SQL types provide for inheritance, either where all objects inherit attributes from one or more "super" types or where objects can inherit attributes from multiple other objects (i.e., multiple inheritance). SQL types can be instantiable, in which case the object can be instantiated, or uninstantiable, in which case an object cannot be instantiated from the type. When a type is uninstantiable, typically instantiable sub-types are derived from that uninstantiable type.

The operations allowed for compound objects include observer, mutator, constructor, copy constructor, and user defined functions. Each attribute has an observer function that gets the value of that attribute for an object. Each attribute has a mutator function that enables updating the attribute. Each ADT object has a constructor function that enables creating an instance of an object of that abstract data type. Each ADT object has a copy constructor for duplicating an existing instance of an object. User defined functions include transform functions and predicates. Additional supported operations for an ADT object include bind-in and bind-out TO-CLIENT transform functions, FROM-CLIENT transform functions, TO-ROUTINE transform functions, and FROM-ROUTINE transform functions. Moreover, user defined methods, user defined predicates, fetch, insert, and delete are supported for ADT objects.

The following example statements manipulate ADT objects:

CREATE ADT geoShape (area float, length float, mbr rectangle);

CREATE ADT circle UNDER geoShape (centerX int, centerY int, radius int);

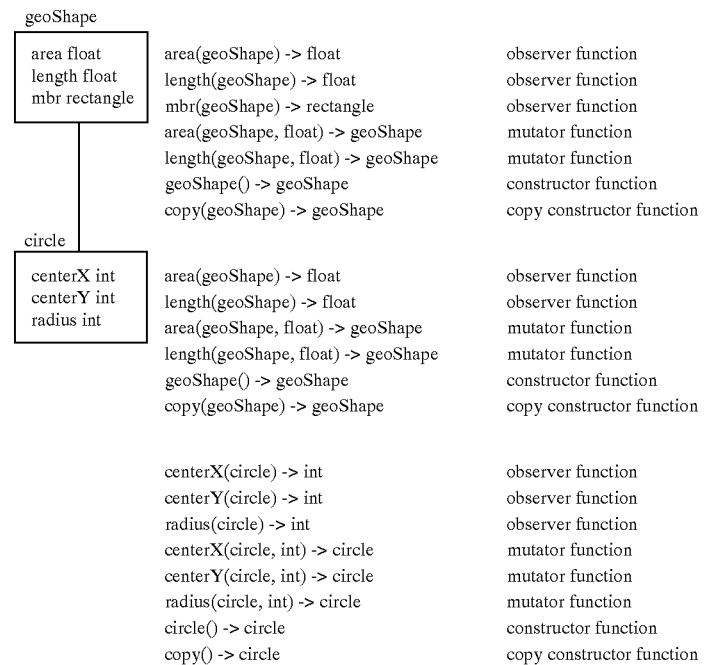

```
CREATE TABLE geoTable(...,shape geoShape,...);
INSERT INTO geoTable VALUES (..., area(geoShape(), 5),...),
                            (..., centerX(circle(), 10),...);
SELECT area(shape) FROM geoTable WHERE...;
```

The Create statement for the ADT geoShape creates a shape using parameters for area, length, and mbr. The Create statement for the ADT circle creates a circle, which is a shape that inherits the attributes of the ADT geoShape. The Create table geoTable statement creates a table that includes a column for geoShapes. The Insert statement then inserts data into the column for geoShapes. The Select statement selects the area attribute for a shape from the table geoTable.

Typically, an ADT object is stored either as a VARCHAR type or as a BLOB object. When stored as a VARCHAR type, fast access to the ADT object is available, however, large ADT objects cannot be defined as they are limited by the page size. When stored as a BLOB object, the access is slow, but there is no size limit for the ADT object. Regardless of storage, ADT objects are advantageous in that they support inheritance, and, hence, better data modeling and data abstraction. Also, the same storage mechanism can be re-used by other compound object types with minimum tuning. Other, related compound objects are array types, collection types, and row types. Each of these compound objects brings up the same issues of storage and performance as apply to ADT objects.

Optimal Storage Mechanism for Persistent Objects

The present invention, a persistent object storer 122, provides an improved storage mechanism for persistent objects. The persistent object storer 122 determines at runtime whether to store an object "inline" based on the size of an inline buffer and the size of the object. Additionally, the persistent object storer 122 supports a user-defined inline length for indicating the amount of data that is to be stored inline (i.e., the size of the inline buffer). A user can then select fast access to particular data from a LOB object or a compound object (e.g., an ADT object). When data is to be stored inline, at least a portion of the data is stored in an inline buffer, which is a portion of the record buffer.

An inline descriptor for an inline buffer contains a header that fully describes the actual storage mechanism used to store the object and indicates the length of the inline buffer. When the persistent object storer 122 determines that the object is to be stored inline, the persistent object storer 122 stores the inline descriptor and as much of the object as can fit in the inline buffer. The remainder of the object is stored as a LOB object, with the LOB descriptor stored in the inline buffer. The inline buffer is stored in the variable-length part of a record.

One of the advantages of using an inline buffer is the ability to pre-fetch data. In particular, frequently used data from a large object could be stored in the inline buffer. Storing the data inline improves performance, and the ability to select the data to be inline provides flexibility.

Furthermore, the industry is moving towards re-using code. Therefore, when a new application is created, users want to be able to re-use objects, such as programming language objects and COM objects. Re-using these objects saves development time and expense. Therefore, new applications should address code re-use. The persistent object storer 122 is advantageous in that it provides an improved storage mechanism for large objects, including programming language objects.

Figure 8:
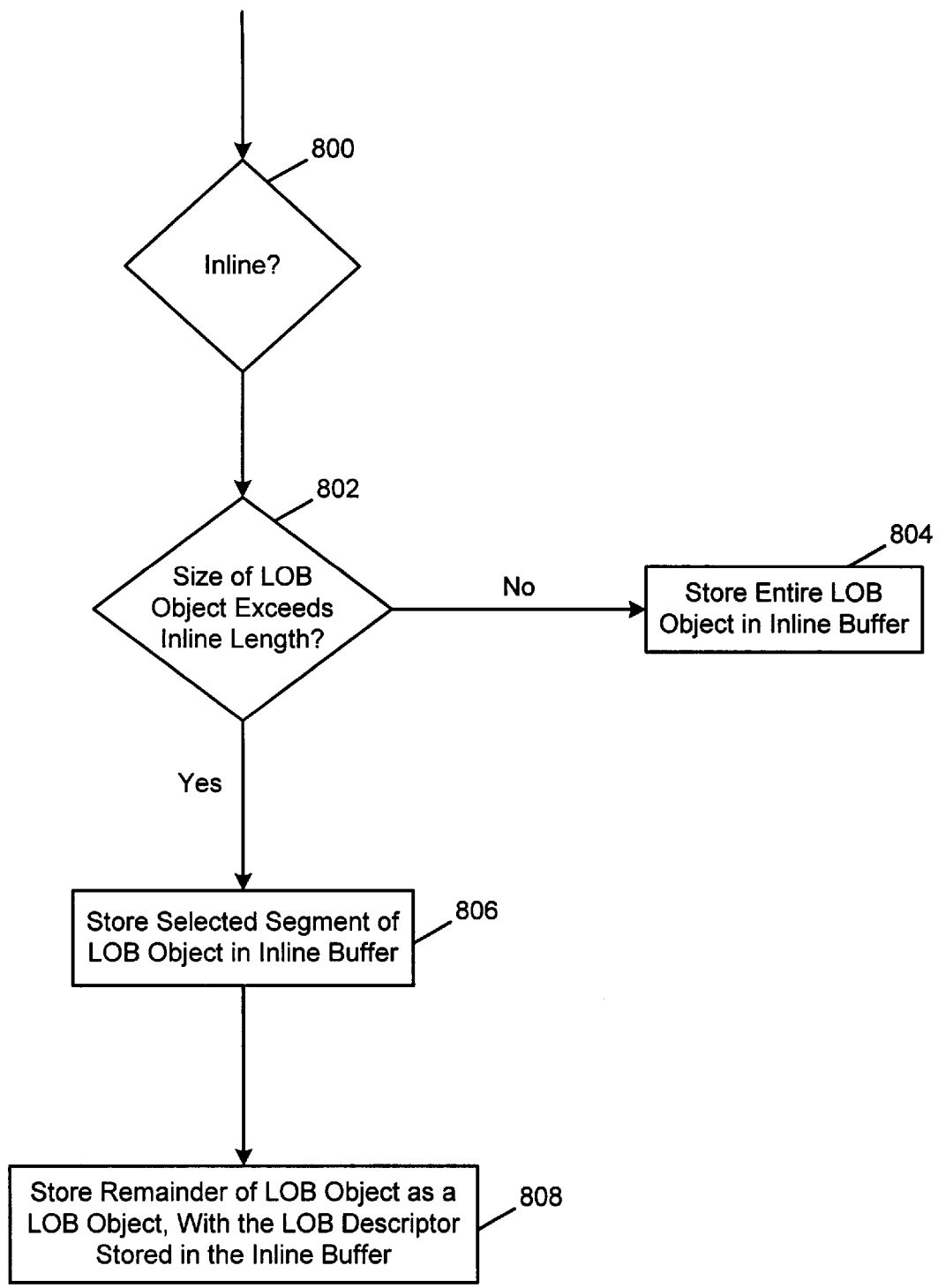
FIG. 8 is a flow diagram illustrating the steps performed by the persistent object storer to store a large object.

FIG. 8 is a flow diagram illustrating the steps performed by the persistent object storer 122 to store a large object. In Block 800, the persistent object storer 122 determines at runtime whether a LOB object should be stored in an inline buffer. When the LOB object is to be stored in the inline buffer, in Block 802, the persistent object storer 122 determines whether the size of the LOB object exceeds the user defined limit for the inline length. When the size of the LOB object does not exceed the limit, the persistent object storer 122 continues at Block 804 and stores the entire object in the inline buffer. When the LOB object does exceed the limit, the persistent object storer 122 continues at Block 806 and stores a selected segment of the LOB object in the inline buffer. In Block 808, the persistent object storer 122 stores the remaining segments of the LOB object as a LOB object, with the LOB descriptor stored in the inline buffer.

A user specifies the size of the inline buffer when creating a table that contains a column for LOB objects. The following example SQL query illustrates specifying the size of the inline buffer:

CREATE TABLE t (c BLOB(1M) length (1K));

The first argument to the BLOB object (i.e., 1M) indicates the maximum size of the BLOB object. The second argument to the BLOB object (i.e., length (1K)) indicates the inline buffer size in the record buffer allocated for the BLOB object. When the persistent object storer 122 determines at runtime that the BLOB object is to be stored inline, if the BLOB object is smaller than 1K−n, where n is the length of the inline descriptor (e.g., header) stored in the inline buffer, the persistent object storer 122 stores the BLOB object in the inline buffer. If the BLOB object is larger than 1K−n, a selected amount of data (i.e., 1K−n−m bytes, where m is the size of the LOB descriptor) is stored in the inline buffer along with a LOB descriptor. The LOB descriptor identifies the location of the remaining portion of the BLOB object. By storing smaller LOB objects inline, the persistent object storer 122 obtains improved performance. When using the inline buffer with larger LOB objects, the persistent object storer 122 is able to perform a pre-fetch by storing selected data in the inline buffer.

Figure 9:
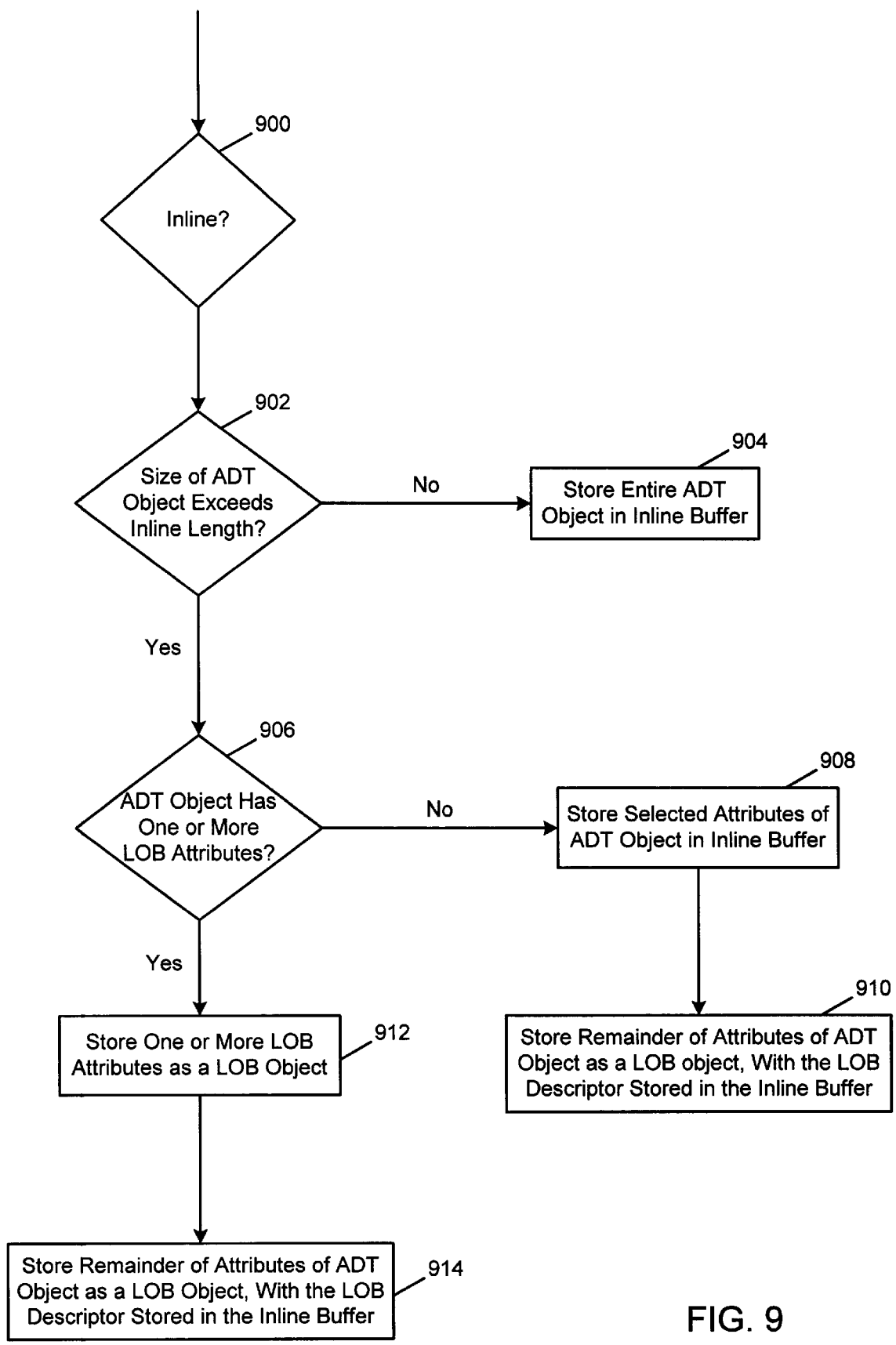
FIG. 9 is a flow diagram illustrating the steps performed by the persistent object storer to store a compound object, such as an ADT object.

FIG. 9 is a flow diagram illustrating the steps performed by the persistent object storer 122 to store a compound object, such as an ADT object. In Block 900, the persistent object storer 122 determines at runtime whether an ADT object should be stored in an inline buffer. When the ADT object is to be stored in the inline buffer, in Block 902, the persistent object storer 122 determines whether the size of the ADT object exceeds the user defined limit for the inline length. When the size of the ADT object does not exceed the limit, the persistent object storer 122 continues at Block 904 and stores the entire ADT object in the inline buffer. An ADT object can have one or more LOB attributes. When the LOB attributes are small enough that the entire ADT object can be stored inline, the LOB attributes are also stored in the inline buffer. When the size of the ADT object exceeds the user defined limit, the persistent object storer 122 continues at Block 906 to determine whether the ADT object has one or more LOB attributes. When the ADT object does not have LOB attributes, the persistent object storer 122 continues at Block 908 and stores selected attributes of the ADT object in the inline buffer. Then in Block 910, the persistent object storer 122 stores the remaining attributes of the ADT object as a LOB object, with the LOB descriptor stored in the inline buffer. When the ADT object does have LOB attributes, the persistent object storer 122 continues at Block 912 and stores one or more LOB attributes as a LOB object, with the LOB descriptor stored in the inline buffer. In Block 914, the persistent object storer 122 stores the remaining attributes of the ADT object in the inline buffer.

The following example SQL query illustrates the creation of ADT objects:

CREATE adt t(attr1 type 1, . . . , attrn typex) length(2K);

CREATE table (c t length(1K));

The Create ADT object statement creates an ADT object having attributes 1–x and specifies an inline buffer of length 2K. The Create table statement creates a table having a column, c, for storing ADT objects having a length of 1K. The length statement in the Create table statement allows modifying the length set by the Create ADT object statement. When the ADT object is smaller than 1K, the persistent object storer 122 stores the entire ADT object in the inline buffer. When the ADT object is not less than 1K and does not have LOB attributes, the persistent object storer 122 stores selected attributes from among the attributes 1–x in the inline buffer and stores the remaining attributes as a LOB object, with the LOB descriptor to the LOB object stored in the inline buffer. When the ADT object is not less than 1K and does have LOB attributes, the persistent object storer 122 stores selected LOB attributes as an LOB object, with the LOB descriptor to the LOB object stored in the inline buffer, and stores the remaining attributes of the ADT object in the inline buffer.

Although the example above was directed to ADT objects, one skilled in the art would recognize that a similar storage mechanism could be used for other compound objects, such as an array, a list, or a set. Additionally, in an alternative embodiment, a user could specify whether objects are to be stored inline, by, for example, setting a flag. In this case, the persistent object storer 122 would determine whether to store an object inline based on the user specification.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer implemented storage mechanism for persistent objects in a database management system. The present invention provides an improved storage mechanism for persistent objects. The present invention also provides an inline buffer for use in storing persistent objects. Additionally, the present invention provides a storage mechanism for both compound and non-compound objects that uses large objects to store data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a computer, the statement being performed by the computer to manipulate data in a database stored on a data storage device connected to the computer, the method comprising the steps of:
   (a) determining at runtime whether an object is to be stored in an inline buffer, wherein the inline buffer is a portion of a record buffer;
   (b) when the object can be entirely stored in the inline buffer, storing the object in the inline buffer; and
   (c) when the object cannot be entirely stored in the inline buffer,
      (i) storing a selected portion of the object in the inline buffer; and
      (ii) storing a remaining portion of the object as a large object outside of the record buffer.

2. The method of claim 1 above, further comprising the step of storing an indicator in the inline buffer indicating a storage mechanism for the object.

3. The method of claim 1 above, further comprising the step of storing a large object descriptor in the inline buffer indicating a storage mechanism for the large object.

4. The method of claim 1 above, further comprising the step of retrieving a user-defined size for the inline buffer.

5. The method of claim 1 above, wherein the object is a large object.

6. The method of claim 1 above, wherein the object is a compound object.

7. The method of claim 6 above, wherein the compound object is an abstract data type object having a plurality of attributes, further comprising:
   storing one or more attributes as a large objects; and
   storing the remaining attributes in the inline buffer.

8. The method of claim 7 above, wherein the abstract data type object has one or more LOB attributes, further comprising:
   storing one or more LOB attributes as a large object; and
   storing the remaining attributes in the inline buffer.

9. The method of claim 6 above, wherein the compound object is an array.

10. The method of claim 6 above, wherein the compound object is a list.

11. The method of claim 6 above, wherein the compound object is a set.

12. An apparatus for executing a statement, comprising:
   a computer having a data storage device connected thereto, wherein the data storage device stores a database;
   one or more computer programs, performed by the computer, for determining at runtime whether an object is to be stored in an inline buffer, wherein the inline buffer is a portion of a record buffer, for, when the object can be entirely stored in the inline buffer, storing the object in the inline buffer, and, for, when the object cannot be entirely stored in the inline buffer, storing a selected portion of the object in the inline buffer and storing a remaining portion of the object as a large object outside of the record buffer.

13. The apparatus of claim 12 above, further comprising the means for storing an indicator in the inline buffer indicating a storage mechanism for the object.

14. The apparatus of claim 12 above, further comprising the means for storing a large object descriptor in the inline buffer indicating a storage mechanism for the large object.

15. The apparatus of claim 12 above, further comprising the means for retrieving a user-defined size for the inline buffer.

16. The apparatus of claim 12 above, wherein the object is a large object.

17. The apparatus of claim 12 above, wherein the object is a compound object.

18. The apparatus of claim 17 above, wherein the compound object is an abstract data type object having a plurality of attributes, further comprising:
   means for storing one or more attributes as a large objects; and
   means for storing the remaining attributes in the inline buffer.

19. The apparatus of claim 18 above, wherein the abstract data type object has one or more LOB attributes, further comprising:

means for storing one or more LOB attributes as a large object; and means for storing the remaining attributes in the inline buffer.

20. The apparatus of claim 17 above, wherein the compound object is an array.

21. The apparatus of claim 17 above, wherein the compound object is a list.

22. The apparatus of claim 17 above, wherein the compound object is a set.

23. An article of manufacture comprising a computer program carrier readable by a computer and embodying one or more instructions executable by the computer to perform method steps for executing a statement, the statement being performed by the computer to manipulate data in a database stored in a data storage device connected to the computer, the method comprising the steps of:

(a) determining at runtime whether an object is to be stored in an inline buffer, wherein the inline buffer is a portion of a record buffer;

(b) when the object can be entirely stored in the inline buffer, storing the object in the inline buffer; and (c) when the object cannot be entirely stored in the inline buffer,
   (i) storing a selected portion of the object in the inline buffer; and
   (ii) storing a remaining portion of the object as a large object outside of the record buffer.

24. The method of claim 23 above, further comprising the step of storing an indicator in the inline buffer indicating a storage mechanism for the object.

25. The method of claim 23 above, further comprising the step of storing a large object descriptor in the inline buffer indicating a storage mechanism for the large object.

26. The method of claim 23 above, further comprising the step of retrieving a user-defined size for the inline buffer.

27. The method of claim 23 above, wherein the object is a large object.

28. The method of claim 23 above, wherein the object is a compound object.

29. The method of claim 28 above, wherein the compound object is an abstract data type object having a plurality of attributes, further comprising:

storing one or more attributes as a large objects; and storing the remaining attributes in the inline buffer.

30. The method of claim 29 above, wherein the abstract data type object has one or more LOB attributes, further comprising:

storing one or more LOB attributes as a large object; and storing the remaining attributes in the inline buffer.

31. The method of claim 28 above, wherein the compound object is an array.

32. The method of claim 28 above, wherein the compound object is a list.

33. The method of claim 28 above, wherein the compound object is a set.

* * * * *